Figure 8:
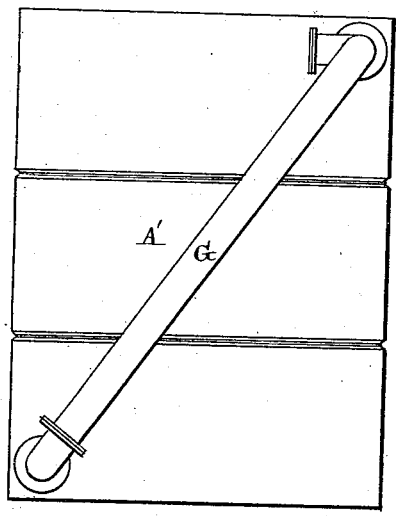

(No Model.) 3 Sheets—Sheet 1.
J. FLANNERY.
Hydrocarbon Gas Generator.
No. 237,663. Patented Feb. 8, 1881.
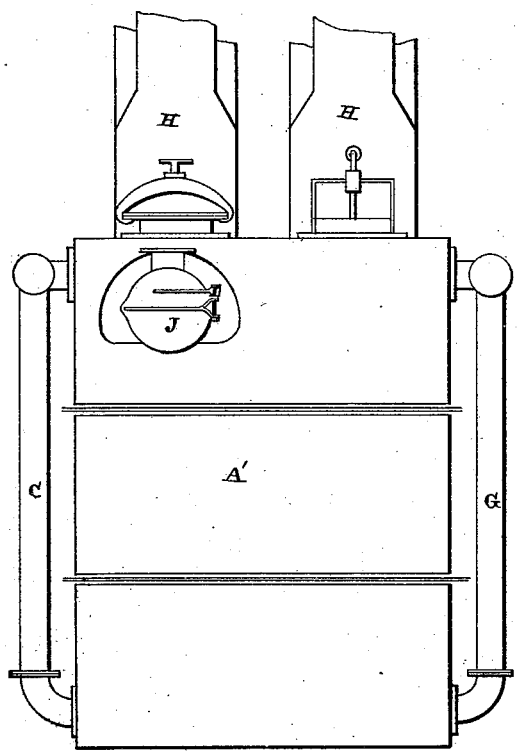
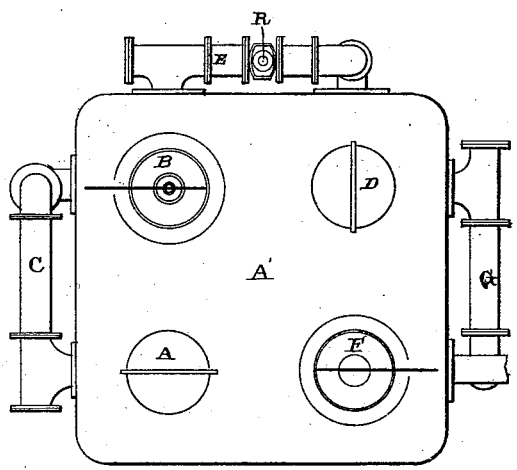
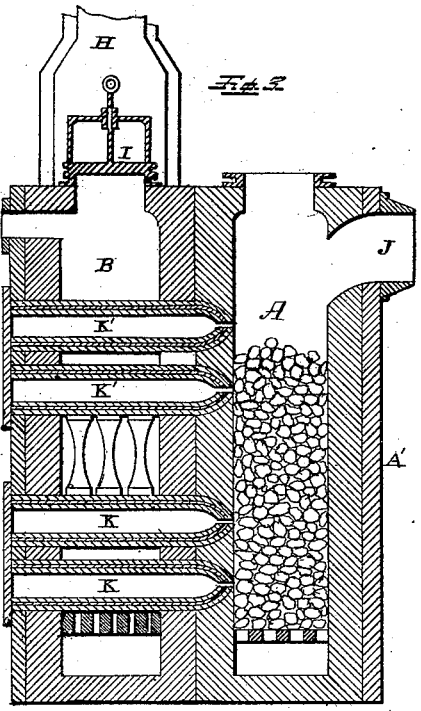

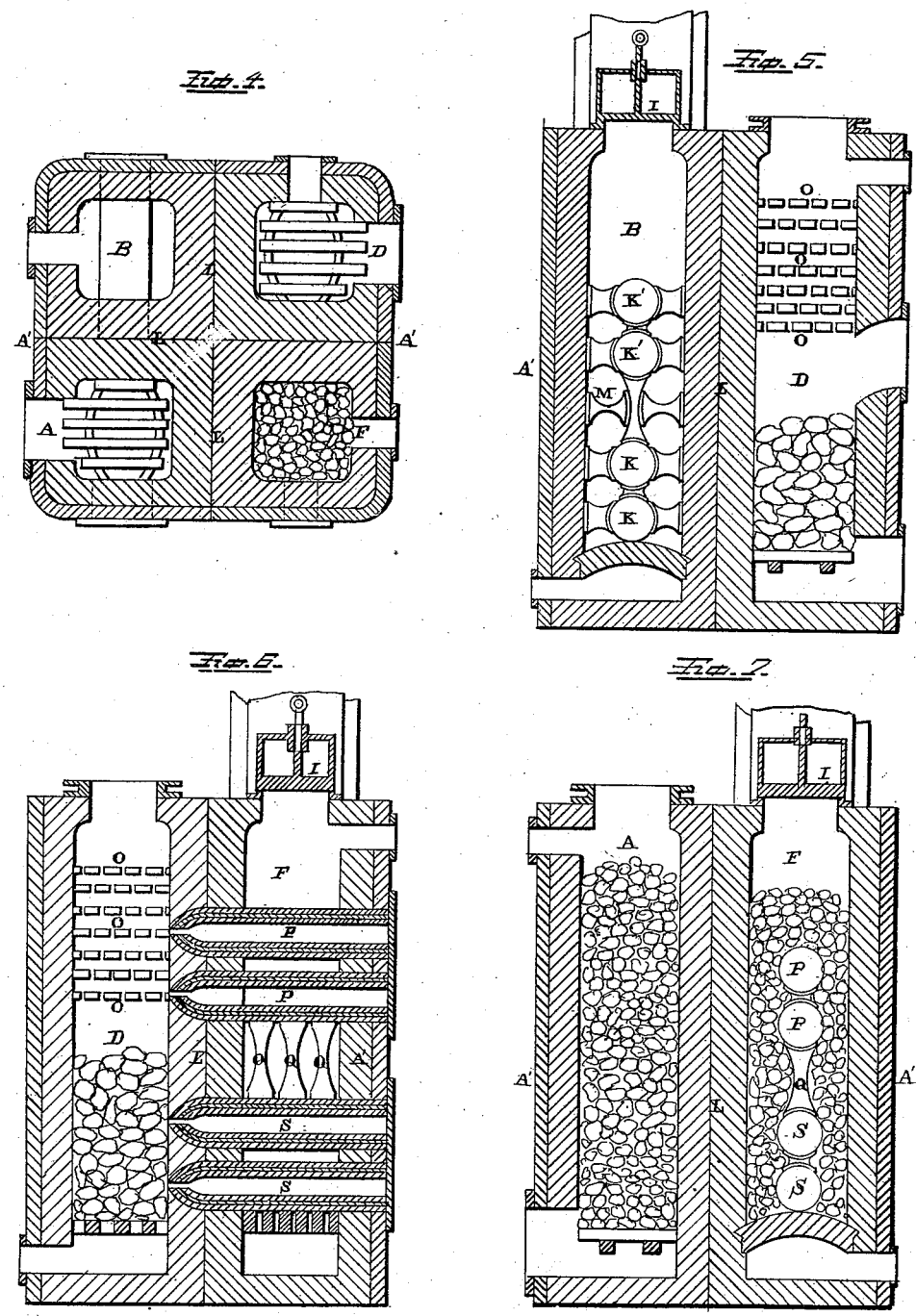

(No Model.)

J. FLANNERY.
Hydrocarbon Gas Generator.

No. 237,663.

3 Sheets—Sheet 3.

Patented Feb. 8, 1881.

Witnesses
W. W. Mortimer
C. H. Isham

Inventor
Jos. Flannery,
per
F. A. Lehmann
Atty

UNITED STATES PATENT OFFICE.

JOSEPH FLANNERY, OF PHILADELPHIA, PENNSYLVANIA.

HYDROCARBON-GAS GENERATOR.

SPECIFICATION forming part of Letters Patent No. 237,663, dated February 8, 1881.

Application filed May 6, 1880. (No model.)

*To all whom it may concern:*

Be it known that I, JOSEPH FLANNERY, of Philadelphia, in the county of Philadelphia and State of Pennsylvania, have invented certain new and useful Improvements in Hydrocarbon-Gas Generators; and I do hereby declare the following to be a full, clear, and exact description of the invention, such as will enable others skilled in the art to which it pertains to make and use it, reference being had to the accompanying drawings, which form part of this specification.

My invention relates to an improvement in hydrocarbon-gas generators; and it consists in placing side by side four separate and distinct chambers, which are incased in the same shell or frame-work, and which are connected on the outside of the casing by pipes, so that the product of the first chamber can be successively passed through each one of the others.

It further consists in incasing in the same frame-work four vertical chambers, which are connected together on the outside of the casing by pipes, one of which pipes is provided with a suitable valve, so that two of the chambers can be separated or cut off from the other two, and thus two of the chambers alone can be used for generating the gas instead of all four, when either repairs are necessary in the other two chambers, or when it is desired to produce a non-luminous or fuel gas in two of the chambers and a carbureted or luminous gas in the other two.

It still further consists in the combination of four vertical chambers, which are incased in the same frame-work and connected together on the outside of the casing by means of pipes, in the third one of which chambers there is made a fire of graphite or any dense carbonaceous substances, through which the waste products of combustion from the second chamber is passed for the purpose of converting the carbonic acid into carbonic oxide, and thus a valuable heating and combustible gas is produced.

It still further consists in placing in the third chamber, above the graphite or carbonaceous fire, a series of perforated plates, which are made from a highly refractory material, whereby the volume of gas is greatly expanded and the destructive distillation of all the compounds which form the gas is more thoroughly perfected.

Figure 1 is a side elevation of my generator. Fig. 2 is a plan view of the same. Fig. 3 is a vertical section through the two chambers A B. Fig. 4 is a horizontal section taken through all four of the chambers. Fig. 5 is a vertical section taken through the two chambers B D. Fig. 6 is a vertical section taken through the two chambers D F. Fig. 7 is a vertical section taken through the two chambers A F; and Fig. 8 is a side elevation of one side of the retort, showing the diagonal pipe only.

A' represents the frame-work, which is built up in four separate and distinct sections, which are separated from each other by means of the metal partitions L, which prevent the gases from passing from one chamber to the other through the material of which the frame-work is built, and thus prevents them from mingling together. Outside of this brick-work of the casing is placed a suitable non-conducting coating or covering of any suitable thickness, and outside of this non-conducting coating is placed a sheathing of boiler or other suitable iron or metal. In this frame-work are the four vertical chambers A B D F, which are connected together on the outside of the casing or frame-work by means of the three pipes C E G. In the pipe E is placed a suitable valve or stop-cock, by means of which the two chambers A B can be entirely cut off from the two D F. Upon the top of the two chambers B F are placed the stacks H, in the bottoms of which are placed suitable valves I, by means of which the tops of these two chambers can be hermetically sealed, and thus prevent the escape of the gas from either one of the chambers while the gas is being generated. The products of combustion may be allowed to escape from either stack, or from the stack on the last chamber alone, or from both together, while the conditions are being obtained for making non-luminous gas in one section of the two chambers and a luminous gas in the other two.

The first chamber, A, of the series has a fire built in it, and it is then filled about threefourths full, more or less, through the opening J, with coal or any other suitable carbonaceous material. The blast or natural draft is then started in any suitable manner, and the products of imperfect combustion (carbonic oxide) are passed through the pipe C, from the top of this chamber A down to the bottom of the chamber B, where it is met with the requisite quantity of atmospheric air to enable its combustion. This carbonic-oxide gas, in passing up through the chamber B, around through the sides of the retorts K and their settings M, has practically all of its heating qualities eliminated and absorbed by the retorts and their settings, so that when the gas reaches the top of the chamber B it has been converted practically into carbonic-acid gas. The valve I on the top of the chamber B being closed, this carbonic-acid gas passes from the top of the chamber B, through the pipe E, down into the bottom of the chamber D, in which there is built a fire of graphite or other dense carbonaceous material. As this gas passes up through the graphite fire it receives an equivalent of carbon, and is thus converted into carbonic-oxide gas. Right above the fire in this chamber D the carbonic-oxide gas is met by a suitable quantity of atmospheric oxygen for the purpose of rendering the gas combustible. In this chamber D, at any suitable distance above the fire, are a series of perforated plates, O, which are made of any highly refractory material, having about ten per cent. of carbon mixed with it, for the purpose of preventing any absorption of the gas. The perforations in these plates are preferably very small, so as to prevent any flame from passing through them. These plates become intensely heated in obtaining the conditions necessary for the production of gas for the purpose of causing a more thorough decomposition at this point, and for the purpose of expanding its volume. From the top of this chamber D a very large volume of heat is passed through the pipe G into the bottom of the chamber F, which is filled with an oxide-of-iron ore, which is packed closely in around the retorts P and S and their settings Q. While passing through this oxide-of-iron ore or other refractory material the gas is absorbed by this ore, the retorts, and their settings, and the heat of the incandescent ore serves to practically deoxidize the gas in its passage through it. The waste products of combustion then pass out through the stack upon the top of this chamber F. When the conditions for thus producing gas are thus obtained or complete, the valve in the top of the chamber F is closed. Steam is now passed or injected through the two separate heating-retorts K, which are filled with graphite or any other highly refractory material, and passes into and through the bed of incandescent carbonaceous material or fuel in the chamber A. This superheated steam passing up through this bed of fuel is decomposed and has its hydrogen set free. Also passing through the chamber B at any suitable distance above the retorts K are a series of retorts, K', into which any suitable carbonaceous material in the form of oils, fats, coal, or any other suitable form, may be placed and destructively distilled, and the products of this distillation passing into the top of the bed of incandescent fuel in the chamber A in a gaseous state mingle with the water-gas, and the two together thus form a hydrocarbon illuminating - gas. This gas passes through the pipe C, down into the bottom of the chamber B, up around the retorts K and K' and their settings, and becomes there more thoroughly a fixed gas.

When only a heating or non-illuminating gas is needed, the gas thus formed may be passed directly into a receptacle or holder for the same.

In order to pass the gas thus formed from the chamber B into the gas-purifier, the valve R in the pipe E must be closed so as to separate these two chambers A B from the two D F. This separation may take place either when repairs are being made in the two chambers D F, or where the sets of chambers are being worked independently of each other for the purpose of producing a non-illuminating or heating gas in the two chambers A B, as above described, and the illuminating-gas in the two chambers D F at the same time. These two sets of chambers A B and D F may thus be worked entirely independent of each other; but the best results are obtained when the four are worked together.

When the gas is passed from the top of the chamber B, through the pipe E, into the bottom of the chamber D, through the graphite fire, the sulphur compounds are to a very considerable extent eliminated, and a more thorough destructive distillation is obtained. The gas then passing up through the heated perforated plates O is here more thoroughly decomposed, and has its volume greatly enlarged before passing through the pipe G down into the bottom of the deoxidizing - chamber F. This gas, passing through this heated iron ore or other refractory material possessing an affinity for oxygen, is not only deoxidized, but has the remaining offensive sulphur compounds to a considerable extent absorbed. The gas passes from the top of this chamber to the ordinary hydraulic main, and thence through the usual gas apparatus.

Extending through the chamber F into the chamber D are two other series of retorts, P and S. Through the the retorts S, when the first section of the chambers A B is thrown out or disconnected for the purpose of repairs or producing a non-luminous fuel-gas, steam is injected, and into the retorts P any suitable carbonaceous material is placed, as already described in connection with the retorts K and K', for the purpose of producing an illuminating-gas alone. By thus providing each set of chambers with two sets of retorts, each set of chambers can be worked perfectly for producing a certain kind of gas independently of the other set. These retorts are formed of metal tubes or rings, which are protected both upon the inner and outer sides with a silicate of alumina and carbon compounds, whereby the retorts are made much more serviceable and their durability greatly enhanced.

I am aware that it is not broadly new to inclose four vertical chambers in a single casing; but the chambers have never before been connected together and operated in the manner described.

Having thus described my invention, I claim—

1. In a gas-generator, the combination of the four vertical chambers, located in a single frame-work and connected together by diagonal pipes, substantially as shown.

2. In a gas-generator, the combination of the four vertical chambers, which are connected together by means of the pipes C E G, the pipe E being provided with a valve, R, whereby the two sets of chambers can be disconnected, and each set operated independently of each other for the production of a non-luminous heating-gas and a luminous gas, substantially as described.

3. In a gas-generator composed of a series of vertical chambers which are connected together by outside pipes, the retorts K and K', passing through the chamber B and heated by the products of imperfect combustion from the chamber A, for the purpose of superheating the steam and distilling the carbonaceous material, substantially as specified.

4. In a gas-generator the combination of a series of chambers which are connected together by pipes, one of the chambers of which series is adapted to receive a fire of carbonaceous material in its bottom and is provided with a series of perforated plates in its top, so as to expand and fix the gas as it passes through the plates, substantially as specified.

In testimony that I claim the foregoing I have hereunto set my hand this 24th day of April, 1880.

JOSEPH FLANNERY.

Witnesses:
CHAS. H. ISHAM,
WILL. H. KERN.